US010783670B2

(12) United States Patent
Saa-Garriga et al.

(10) Patent No.: US 10,783,670 B2
(45) Date of Patent: Sep. 22, 2020

(54) METHOD FOR COMPRESSION OF 360 DEGREE CONTENT AND ELECTRONIC DEVICE THEREOF

(71) Applicant: Samsung Electronics Co., Ltd., Suwon-si, Gyeonggi-do (KR)

(72) Inventors: Albert Saa-Garriga, Staines (GB); Alessandro Vandini, Staines (GB); Tommaso Maestri, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 16/158,623

(22) Filed: Oct. 12, 2018

(65) Prior Publication Data

US 2019/0114807 A1  Apr. 18, 2019

(30) Foreign Application Priority Data

Oct. 12, 2017  (GB) .................... 1716710.7

(51) Int. Cl.
*G06T 3/60* (2006.01)
*H04N 19/172* (2014.01)
*H04N 19/513* (2014.01)
*G06T 9/00* (2006.01)
*H04N 19/597* (2014.01)
*G06N 3/08* (2006.01)

(52) U.S. Cl.
CPC ............... *G06T 9/002* (2013.01); *G06T 3/60* (2013.01); *H04N 19/172* (2014.11); *H04N 19/513* (2014.11); *H04N 19/597* (2014.11); *G06N 3/08* (2013.01); *G06T 2207/20081* (2013.01)

(58) Field of Classification Search
CPC . G06T 3/60; G06T 2207/20081; G06T 9/002; G06T 2219/2016; H04N 19/172; H04N 19/513; H04N 19/597; G06N 3/08
See application file for complete search history.

(56) References Cited

U.S. PATENT DOCUMENTS

| 6,204,854 | B1 | 3/2001 | Signes et al. | |
|---|---|---|---|---|
| 2017/0277955 | A1* | 9/2017 | Liu | ........... G06K 9/6298 |
| 2018/0262774 | A1* | 9/2018 | Lin | ........... H04N 19/172 |

* cited by examiner

*Primary Examiner* — Obafemi O Sosanya (57) ABSTRACT

Apparatus and methods are provided. The method includes receiving content that comprises at least one 360 degree image. The method also includes applying a rotation to the at least one 360 degree image to increase a compression ratio, when a compression algorithm compresses the at least one 360 degree image that is rotated, relative to another compression ratio achieved when the compression algorithm compresses the content without the applied rotation to the at least one 360 degree image. The method also includes compressing the content including the at least one 360 degree image that is rotated based on the compression algorithm. The method further includes outputting the compressed content and a rotation parameter that defines the applied rotation.

19 Claims, 10 Drawing Sheets

METHOD FOR COMPRESSION OF 360 DEGREE CONTENT AND ELECTRONIC DEVICE THEREOF

CROSS-REFERENCE TO RELATED APPLICATION

This application is based on and claims priority under 35 U.S.C. § 119 to United Kingdom Patent Application No. 1716710.7 filed on Oct. 12, 2017, the disclosure of which is incorporated by reference herein in its entirety.

BACKGROUND

1. Field

The present disclosure relates to methods, apparatus and computer programs for compression 360 degree content comprising at least one 360 degree image.

2. Description of Related Art

Recent years have seen the emergence of a new generation of media applications that provides a more immersive user experience through the use of 360 degree content, for example in so-called virtual reality (VR) applications. New generation video formats, such as UHD-4K, UHD-8K and 16K (True VR) offer higher resolution and framerates than the current Full High Definition (FHD) format, which provides a resolution of 1920×1080 at a framerate of 30 Hertz (Hz). For example, the 16K format specifies a resolution of 16380×16384 and a framerate of 240 Hz. It can be expected that future generations will adopt even higher resolutions on framerates. A consequence of the ever-increasing image quality from one generation to the next is a commensurate increase in the data rates of uncompressed data. For example, the uncompressed bitrate of Full HD video is 746 megabits per second (Mbps), whereas the uncompressed bitrate of 16K video is 2,038,432 Mbps. There is therefore a need for more effective compression solutions for 360 degree content.

The disclosure on is made in this context.

SUMMARY

According to a first aspect of the present disclosure, there is provided a method of compressing 360 degree content, the method comprising: receiving 360 degree content comprising at least one 360 degree image; applying a rotation to the received 360 degree image such that a compression ratio achieved when the 360 degree content including the rotated 360 degree image is compressed using a compression algorithm is increased, relative to a compression ratio that would be achieved when applying the compression algorithm to the as-received 360 degree content; compressing the 360 degree content including the rotated 360 degree image using the compression algorithm; and outputting the compressed 360 degree content and a rotation parameter defining the applied rotation.

In some embodiments according to the first aspect, the method further comprises selecting the rotation to be applied to the received 360 degree image by evaluating a plurality of candidate rotations, and selecting the rotation which gives the highest compression ratio among the plurality of candidate rotations.

In some embodiments according to the first aspect, the 360 degree content is 360 degree video and the 360 degree image is one of a plurality of frames, and the method further comprises selecting the rotation to be applied to the received 360 degree image based on one or more rotations previously applied to one or more other frames of the 360 degree video.

In some embodiments according to the first aspect, different rotations can be selected for different frames in the 360 degree video.

In some embodiments according to the first aspect, the plurality of candidate rotations are randomly selected from among a plurality of possible rotations.

In some embodiments according to the first aspect, the plurality of candidate rotations are selected based on image analysis of the 360 degree image.

In some embodiments according to the first aspect, the plurality of candidate rotations are selected by analyzing the received 360 degree image to identify a region of low complexity within the 360 degree image, and selecting rotations which will place the identified region in a predefined area of the rotated 360 degree image as the candidate rotations.

In some embodiments according to the first aspect, the plurality of candidate rotations are selected by analyzing the received 360 degree image to identify a region of high frequency within the 360 degree image, and selecting rotations which will place the identified region in a predefined area of the rotated 360 degree image as the candidate rotations.

In some embodiments according to the first aspect, the plurality of candidate rotations are selected by performing line detection on the received 360 degree image to determine a representative line orientation of the 360 degree image, and selecting rotations which will bring the representative line orientation closer to one or more predefined directions, as the candidate rotations.

In some embodiments according to the first aspect, the plurality of candidate rotations are selected by inputting the 360 degree image to a neural network configured to determine candidate rotations that are likely to increase the compression ratio for a given input image.

In some embodiments according to the first aspect, the method further comprises using the method of any one of claims 1 to 9 to determine, for each one of a plurality of 360 degree images, a rotation for increasing the compression ratio of the respective 360 degree image, and training the neural network using said plurality of 360 degree images and the respective determined rotations.

In some embodiments according to the first aspect, the 360 degree content is 360 degree video and the 360 degree image is one of a plurality of frames, and the plurality of candidate rotations are selected by obtaining motion vectors for one or more moving objects in the frames of the 360 degree video, and selecting rotations which will reduce an overall motion vector for the 360 degree image as the candidate rotations.

In some embodiments according to the first aspect, the compression algorithm is selected from among a plurality of available compression algorithms, and the plurality of candidate rotations are selected in accordance with the selected compression algorithm.

In some embodiments according to the first aspect, outputting the compressed 360 degree content and the rotation parameter comprises storing at least the compressed 360 degree content in computer-readable memory.

In some embodiments according to the first aspect, the method further comprises reproducing the 360 degree content by determining an inverse rotation to be applied to the compressed 360 degree image based on the outputted rotation parameter, wherein the inverse rotation is an opposite rotation to the rotation that was applied before compression, applying the inverse rotation to the compressed 360 image to obtain a second rotated 360 degree image, and reproducing the 360 degree content by rendering the second rotated 360 degree image.

In some embodiments according to the first aspect, the method further comprises receiving camera control input defining a camera rotation to be applied during reproduction of the 360 degree content, wherein the second rotated 360 degree image is obtained by applying the camera rotation in addition to the inverse rotation.

In some embodiments according to the first aspect, the 360 degree content is 360 degree video and the 360 degree image is one of a plurality of frames, wherein the rotation parameter is defined in metadata associated with the compressed 360 degree content, the metadata further comprising a camera stabilization parameter defining one or more stabilizing rotations to be applied to one or more of the plurality of frames for stabilizing the 360 degree video during reproduction, and wherein the second rotated 360 degree image is obtained by applying the stabilizing rotation corresponding to the 360 degree image in addition to the inverse rotation.

In some embodiments according to the first aspect, the compression algorithm is an encoding algorithm for converting the 360 degree content to a different format relative to a format of the received 360 degree content.

In some embodiments according to the first aspect, the 360 degree content consists of the 360 degree image.

According to a second aspect of the present disclosure, there is provided a method of processing 360 degree content, the method comprising receiving 360 degree content comprising at least one 360 degree image, determining a rotation to be applied to the received 360 degree image such that a compression ratio achieved when the 360 degree content including the rotated 360 degree image is compressed using a compression algorithm is increased, relative to a compression ratio that would be achieved when applying the compression algorithm to the as-received 360 degree content, and outputting the 360 degree content and a rotation parameter defining the applied rotation.

According to a third aspect of the present disclosure, there is provided a non-transitory computer-readable storage medium arranged to store computer program instructions which, when executed, perform a method according to the first aspect or the second aspect.

According to a fourth aspect of the present disclosure, there is provided apparatus for compressing 360 degree video, the apparatus comprising an input for receiving 360 degree content comprising at least one 360 degree image, a processing unit configured to apply a rotation to the received 360 degree image such that a compression ratio achieved when the 360 degree content including the rotated 360 degree image is compressed using a compression algorithm is increased, relative to a compression ratio that would be achieved when applying the compression algorithm to the as-received 360 degree content, and a compression unit configured to compress the 360 degree content including the rotated 360 degree image using the compression algorithm, and to output the compressed 360 degree content and a rotation parameter defining the applied rotation.

In some embodiments according to the fourth aspect, the processing unit is configured to select the rotation to be applied to the received 360 degree image by evaluating a plurality of candidate rotations, and selecting the rotation which gives the highest compression ratio among the plurality of candidate rotations.

In some embodiments according to the fourth aspect, the 360 degree content is 360 degree video and the 360 degree image is one of a plurality of frames, and the processing unit is configured to select the rotation to be applied to the received 360 degree image based on one or more rotations previously applied to one or more other frames of the 360 degree video.

In some embodiments according to the fourth aspect, the processing unit can select different rotations for different frames in the 360 degree video.

In some embodiments according to the fourth aspect, the processing unit is configured to randomly select the plurality of candidate rotations from among a plurality of possible rotations.

In some embodiments according to the fourth aspect, the processing unit is configured to select the plurality of candidate rotations based on image analysis of the 360 degree image.

In some embodiments according to the fourth aspect, the processing unit is configured to select the plurality of candidate rotations by analyzing the received 360 degree image to identify a region of low complexity within the 360 degree image, and selecting rotations which will place the identified region in a predefined area of the rotated 360 degree image as the candidate rotations.

In some embodiments according to the fourth aspect, the processing unit is configured to select the plurality of candidate rotations by analyzing the received 360 degree image to identify a region of high frequency within the 360 degree image, and selecting rotations which will place the identified region in a predefined area of the rotated 360 degree image as the candidate rotations.

In some embodiments according to the fourth aspect, the processing unit is configured to select the plurality of candidate rotations by performing line detection on the received 360 degree image to determine a representative line orientation of the 360 degree image, and selecting rotations which will bring the representative line orientation closer to one or more predefined directions, as the candidate rotations.

In some embodiments according to the fourth aspect, the processing unit is configured to select the plurality of candidate rotations by inputting the 360 degree image to a neural network configured to determine candidate rotations that are likely to increase the compression ratio for a given input image.

In some embodiments according to the fourth aspect, the 360 degree content is 360 degree video and the 360 degree image is one of a plurality of frames, and the processing unit is configured to select the plurality of candidate rotations by obtaining motion vectors for one or more moving objects in the frames of the 360 degree video, and selecting rotations which will reduce an overall motion vector for the 360 degree image as the candidate rotations.

In some embodiments according to the fourth aspect, the processing unit is configured to select the compression algorithm from among a plurality of available compression algorithms, and to select the plurality of candidate rotations in accordance with the selected compression algorithm.

In some embodiments according to the fourth aspect, the apparatus is configured to store at least the compressed 360 degree content in computer-readable memory.

In some embodiments according to the fourth aspect, the apparatus further comprises a reproduction unit configured to reproduce the 360 degree content, wherein the reproduction unit is configured to determine an inverse rotation to be applied to the compressed 360 degree image based on the outputted rotation parameter, the inverse rotation being an opposite rotation to the rotation that was applied before compression, apply the inverse rotation to the compressed 360 degree image to obtain a second rotated 360 degree image, and render the second rotated 360 degree image.

In some embodiments according to the fourth aspect, the reproduction unit is further configured to receive camera control input defining a camera rotation to be applied during reproduction of the 360 degree content, and to obtain the second rotated 360 degree image by applying the camera rotation in addition to the inverse rotation.

In some embodiments according to the fourth aspect, the 360 degree content is 360 degree video and the 360 degree image is one of a plurality of frames, wherein the compression unit is configured to output the rotation parameter as metadata associated with the compressed 360 degree content, the metadata further comprising a camera stabilization parameter defining one or more stabilizing rotations to be applied to one or more of the plurality of frames for stabilizing the 360 degree video during reproduction, and wherein the reproduction unit is configured to obtain the second rotated 360 degree image by applying the stabilizing rotation corresponding to the 360 degree image in addition to the inverse rotation.

In some embodiments according to the fourth aspect, the compression algorithm is an encoding algorithm for converting the 360 degree content to a different format relative to a format of the received 360 degree content.

In some embodiments according to the fourth aspect, the 360 degree content consists of the 360 degree image.

According to a fifth aspect of the present disclosure, there is provided apparatus for processing 360 degree content, the apparatus comprising an input for receiving 360 degree content comprising at least one 360 degree image, and a processing unit configured to determine a rotation to be applied to the received 360 degree image such that a compression ratio achieved when the 360 degree content including the rotated 360 degree image is compressed using a compression algorithm is increased, relative to a compression ratio that would be achieved when applying the compression algorithm to the as-received 360 degree content, and to output the 360 degree content and a rotation parameter defining the applied rotation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments of the present disclosure will now be described, by way of example only, with reference to the accompanying drawings, in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the following detailed description, only certain exemplary embodiments of the present disclosure have been shown and described, simply by way of illustration. As those skilled in the art would realize, the described embodiments may be modified in various different ways, all without departing from the scope of the present disclosure. Accordingly, the drawings and description are to be regarded as illustrative in nature and not restrictive. Like reference numerals designate like elements throughout the specification.

Figure 1:
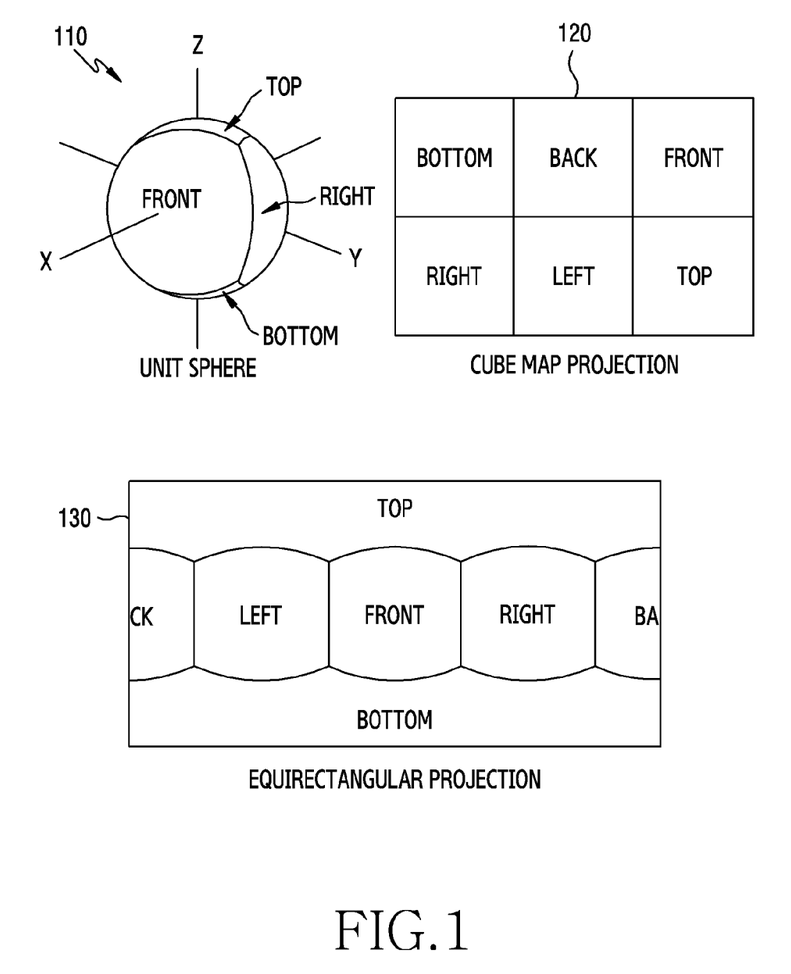
FIG. 1 illustrates equivalent representations of a 360 degree image, according to an embodiment of the present disclosure.

Image data for 360 degree content such as 360 degree video or still images, can be stored in a variety of different formats. Examples of equivalent representations of image data for a 360 degree image are illustrated in FIG. 1, according to an embodiment of the present disclosure. In a unit sphere representation, pixels of the 360 degree image are indexed in a three-dimensional coordinate system which defines the location of each pixel on the surface of a virtual sphere 110. In other embodiments an equivalent two-dimensional representation may be used, such as a cube map projection 120 or equirectangular projection 130. In a cube map projection 120, image data for each face of a virtual cube is stored as a two-dimensional image spanning a 90°×90° field of view. In an equirectangular projection 130, the image data is stored as a single two-dimensional image spanning a 360°×180° field of view. In FIG. 1, the labels 'top', 'bottom', 'front', 'back', 'left' and 'right' indicate corresponding regions of the video data in each of the equivalent projections. The formats illustrated in FIG. 1 are described merely by way of an example, and in other embodiments a 360 degree image may be stored in a different format to the ones shown in FIG. 1.

Figure 2:
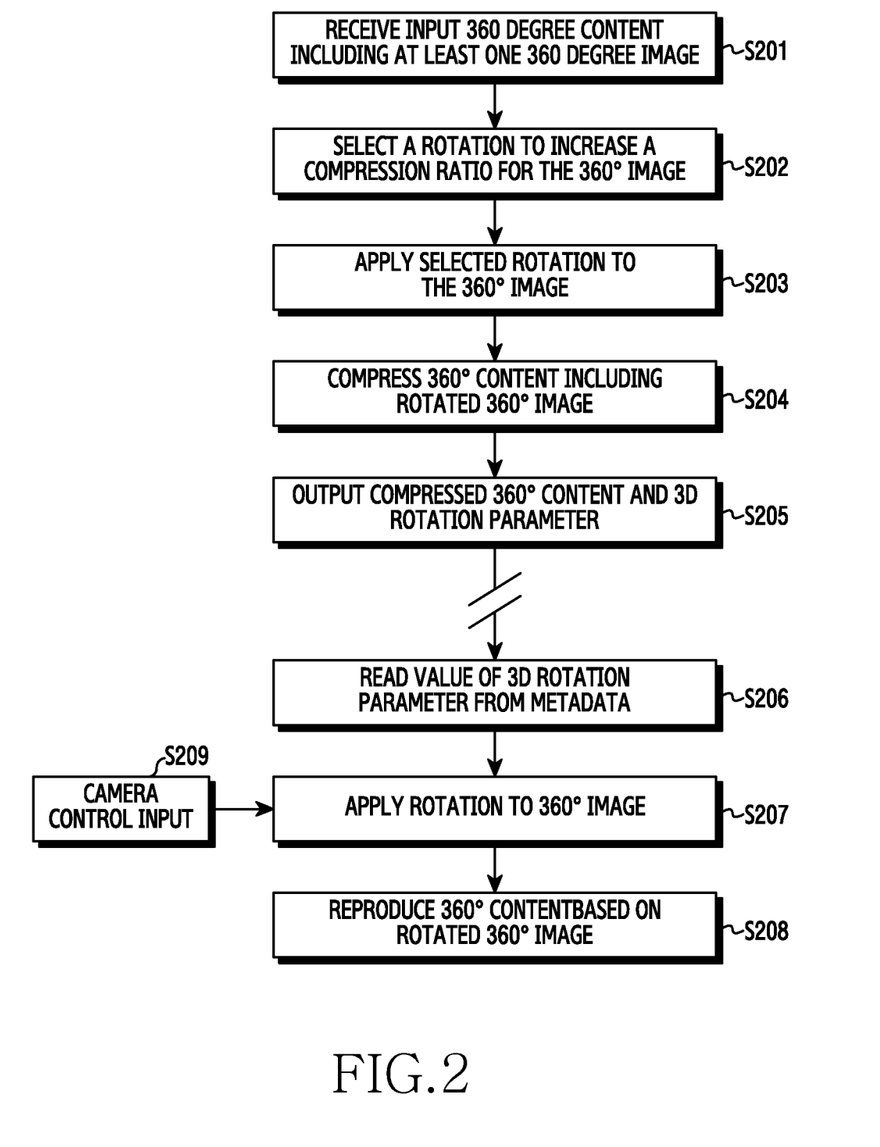
FIG. 2 illustrates a flowchart for compressing 360 degree content, according to an embodiment of the present disclosure.

FIG. 2 illustrates a flowchart for compressing 360 degree content, according to an embodiment of the present disclosure. Depending on the embodiment, all steps in the method may be performed at the same device, or different steps may be performed in different devices. Any of the steps illustrated in FIG. 2 may be performed in software or in hardware, depending on the particular embodiment. When one or more steps are performed in software, apparatus for performing the method may include a processing unit comprising one or more processors, and computer-readable memory having stored therein computer program instructions which, when executed by the processing unit, perform the respective method steps.

First, in step S201, 360 degree content comprising at least one 360 degree image is received. In the present embodiment the 360 degree content is 360 degree video comprising a plurality of frames. In another embodiment the 360 degree content may comprise a single 360 degree image, that is to say, the 360 degree content may consist of the 360 degree image.

The 360 degree content can be received in different ways depending on the embodiment. For example, in some embodiments the 360 degree content may be received via a broadcast stream or Internet Protocol (IP) stream in step S201. In another embodiment the 360 degree content may be pre-recorded content retrieved from memory in step S201, for example local storage in a set-top box (STB) embodiment or network storage in the form of a home media server. In yet another embodiment the 360 degree content may be obtained directly from a suitable image capturing device in step S201, such as a 360 degree camera.

Next, a rotation to be applied to the 360 degree content is selected from among a plurality of candidate rotations in step S202. The rotation that is selected is one which allows a compression ratio achieved when the rotated 360 degree image is compressed to be increased, relative to a compression ratio that would be achieved if the as-received 360 degree image was compressed using the same compression algorithm. The compression ratio can be determined by dividing the uncompressed size of the 360 degree image by the compressed size of the 360 degree image. For example, a compression ratio of 10× indicates that the compressed file size is ten times smaller than the uncompressed file size. Various methods of selecting a suitable rotation are described later.

In some embodiments the step of selecting a rotation in step S202 can be omitted. For example, in a video processing embodiment, the same rotation that was applied to the previous frame can be re-used for the current frame, on the basis that consecutive frames are likely to be similar in content and therefore a rotation which increases the compression ratio of one frame is also likely to be suitable for increasing the compression ratio of the following frame. In other embodiments, different rotations can be selected for different frames in a 360 degree video. In some embodiments, a suitable rotation can be selected at certain intervals during the 360 degree video and applied to a certain number of consecutive frames. For example, a suitable rotation can be determined every 10 frames, and applied to all intervening frames until a new rotation is determined at the next interval.

Next, in step S203 the selected rotation is applied to the 360 degree image in the spherical projection format. The rotation that is selected in step S202 and applied in step S203 may be referred to as a three-dimensional rotation, since the rotation is equivalent to a rotation of the camera or the scene in three-dimensional space. The rotation can comprise a rotation component around each of the principal axes (x, y, z) in the spherical projection format shown in FIG. 1, or may only comprise rotation about one or two axes.

Figure 3:
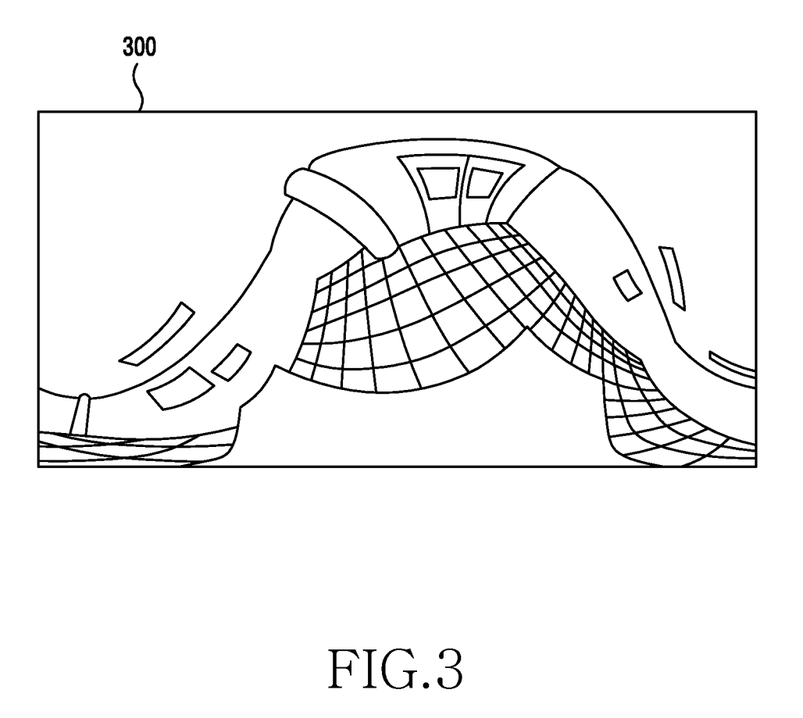
FIG. 3 illustrates a 360 degree image in an equirectangular projection format, according to an embodiment of the present disclosure.
Figure 4:
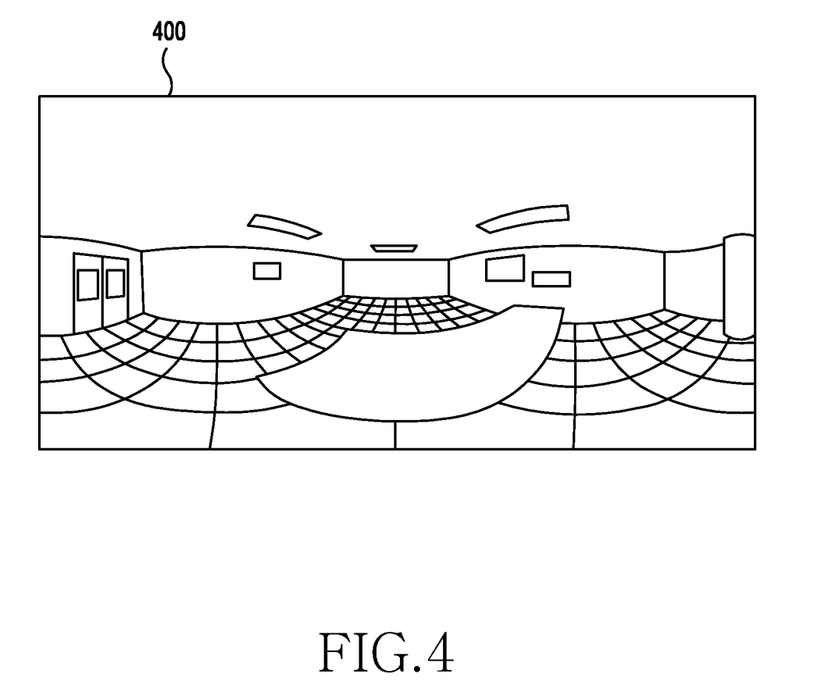
FIGS. 4 and 5 illustrate the 360 degree image of FIG. 3 after applying three-dimensional rotations, according to an embodiment of the present disclosure.
Figure 5:
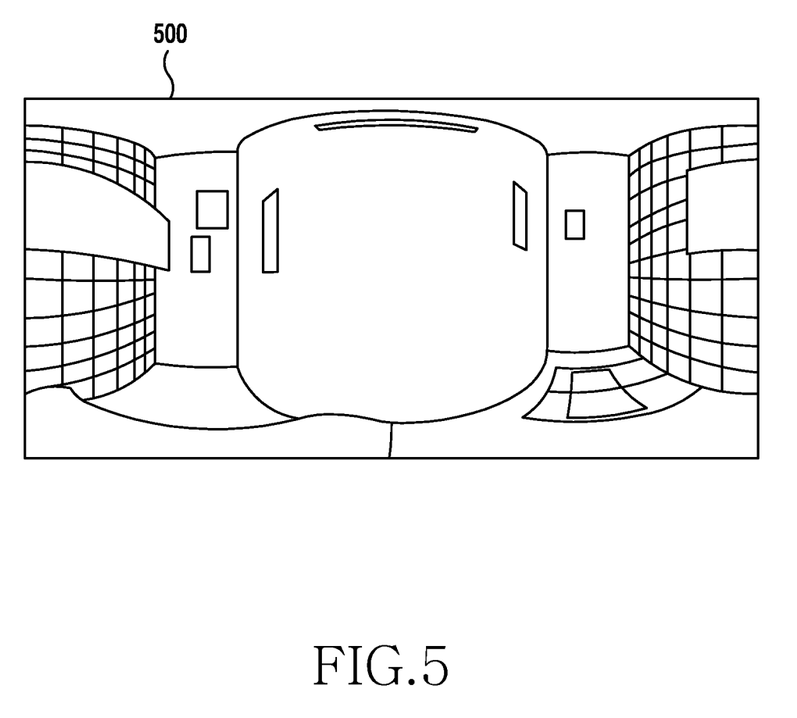
Figure 6:
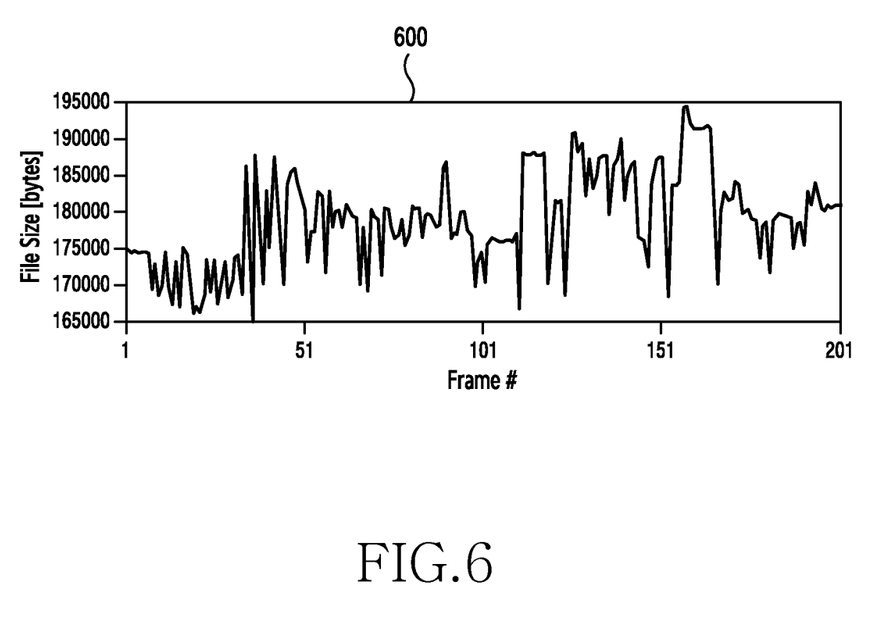
FIG. 6 illustrates a graph showing the effect of a three-dimensional rotation on a compression ratio for a 360 degree image, according to an embodiment of the present disclosure.

The effect of applying a rotation to a 360 degree image on the compression ratio is illustrated in FIGS. 3 to 6. FIG. 3 illustrates a 360 degree image 300 in an equirectangular projection format, and FIGS. 4 and 5 illustrate the 360 degree image 400, and 500 respectively, of FIG. 3, after applying different three-dimensional rotations. FIG. 6 illustrates a graph 600 showing the effect of a three-dimensional rotation on a compression ratio for a 360 degree image, according to an embodiment of the present disclosure.

The data in FIG. 6 was obtained by simulating a 360 degree video recording of a static scene, with only rotational movement of the camera during capture of the video (i.e. no translational movement). Consequently, each frame of the 360 degree video can be mapped onto any other frame by a suitable three-dimensional rotation, and any difference in compression ratio between different frames of the video in the data plotted in FIG. 6 can be attributed to the camera rotation between frames. In the present embodiment the largest file size among the frames plotted in FIG. 6 is 194,538 bytes and the smallest file size is 165,132 bytes. Therefore in the example shown in FIG. 6, the compressed file size of a single frame of 360 degree video can vary by up to about 15% depending on the current camera angle.

Accordingly, in embodiments of the present disclosure, applying a suitable rotation to the 360 degree image in step S203 can increase the compression ratio that will be achieved when the rotated image is compressed. The increase in the compression ratio that can be obtained, relative to the compression ratio that would be achieved when compressing the original un-rotated image, may depend upon various factors such as the characteristics of the compression algorithm that is applied, the current image content, and on the 2D projection format that is used.

Then, in step S204 the 360 degree content including the rotated 360 degree image is compressed by applying a suitable compression algorithm. In some embodiments the compression algorithm may also be configured to encode the 360 degree content into a different format, depending on the desired output format. In embodiments in which the 360 degree content comprises a plurality of images, for example a sequence of 360 degree video frames, a rotation may be applied to every frame or may only be applied to certain frames of the video. In an embodiment in which only certain frames of a 360 degree video are rotated, the 360 degree content that is compressed in step S204 may include some rotated video frames and some as-received (i.e. un-rotated) video frames.

After compressing the 360 degree content, in step S205 the compressed 360 degree content is outputted together with an associated rotation parameter. The rotation parameter defines the rotation that was applied in step S203. The rotation parameter can be used during reproduction of the 360 degree content, for example playback of a 360 degree video, to apply an inverse rotation to the rotated 360 degree image and therefore ensure that the content is displayed in the original orientation. In the present embodiment the rotation parameter is outputted in the form of metadata embedded in the 360 degree video file. In other embodiments, in step S205 the rotation parameter and the 360 degree content may be stored in separate files. In some embodiments, the compressed 360 degree content and the rotation parameter may be stored in computer-readable memory in step S205, either in the same storage unit or in separate storage. For example, in a 360 degree video embodiment, a suitable identifier may be used to allow a display apparatus to identify the specific frame of the 360 degree video to which the rotation parameter relates.

Continuing with reference to FIG. 2, a method of reproducing the compressed 360 degree content at a suitable display apparatus is illustrated. Depending on the embodiment the compressed 360 degree content may be reproduced at the same apparatus which carried out the preceding rotation and compression steps in FIG. 2, or may be reproduced at a separate apparatus.

In step S206, the display apparatus determines the inverse rotation to be applied to the compressed 360 degree image based on the rotation parameter from step S205, by reading the rotation parameter from the metadata associated with the 360 degree video. Here, the inverse rotation is an opposite rotation to the rotation that was applied before compression. In some embodiments the rotation parameter may indicate the inverse rotation. In other embodiments the rotation parameter may indicate the original rotation that was applied in step S203, and the display apparatus may calculate a corresponding inverse rotation in step S206.

Next, in step S207 the determined inverse rotation is applied to the compressed 360 image to obtain a second rotated 360 degree image, as distinct from the first rotated 360 degree image obtained during step S203. Then, in step S208 the 360 degree content is reproduced by rendering the second rotated 360 degree image. By applying the inverse rotation before the 360 degree content is reproduced, it can be ensured that the content will be displayed in the original orientation. Typically, when reproducing 360 degree content only a certain field of view of the current image will be displayed to a user. The field of view that is to be displayed in step S208 depends upon the current camera orientation.

In the present embodiment, the display apparatus that is used to reproduce the 360 degree content in step S208 is also capable of receiving camera control input in step S209, in order to allow a user to change the direction of the camera and thereby view different regions of the 360 degree content. The camera control input defines a camera rotation to be applied during reproduction of the 360 degree content. When camera control input is received in step S209, the camera rotation can be applied in addition to the inverse rotation in step S207.

In a virtual reality embodiment, for example, the camera control input may be received by using sensors such as gyroscopes or accelerometers to detect movement of a headset worn by a user, and change the direction of the camera according to the direction in which the user is currently facing. Alternatively, in other embodiments, such as when viewing the 360 degree content on a television, tablet computer, desktop computer or so on, a suitable controller such as a mouse or TV remote control unit may be used to provide the camera control input.

Furthermore, in some embodiments the 360 degree content may be 360 degree video comprising a plurality of frames, and metadata associated with the 360 degree video may include a camera stabilization parameter which defines a stabilizing rotation to be applied to one or more of the plurality of frames in order to stabilize the 360 degree video during reproduction. The stabilizing rotation may, for example, be a rotation which compensates for camera shake while the 360 degree video was being captured. In embodiments in which a stabilizing rotation is provided, the stabilizing rotation may also be applied in step S207 in addition to the inverse rotation, and in addition to a camera rotation if applicable.

Figure 7:
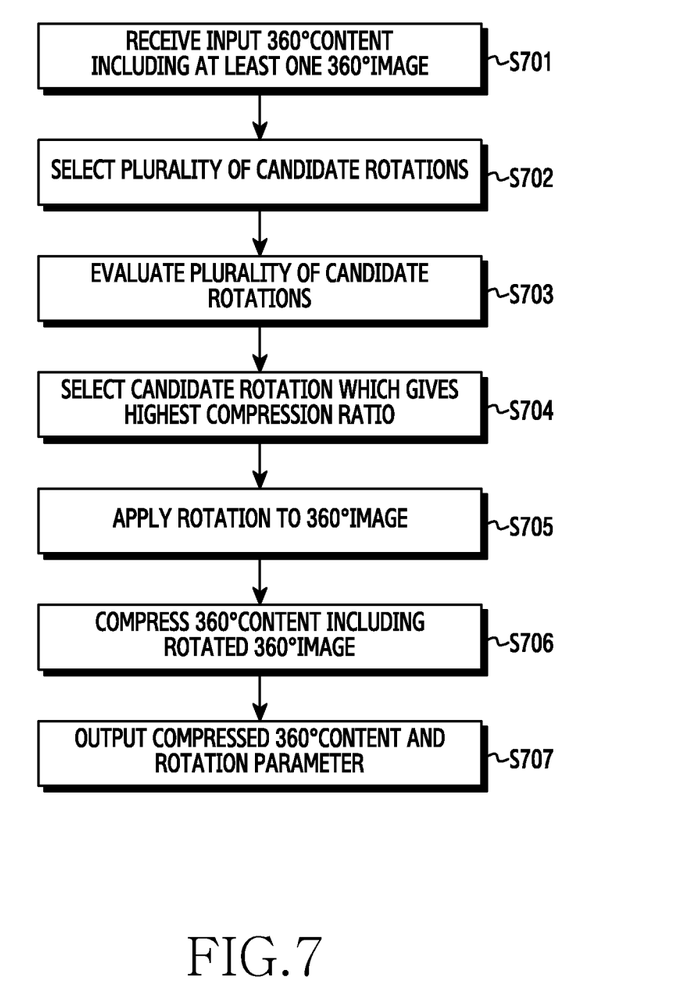
FIG. 7 illustrates a flowchart for compressing 360 degree content by evaluating a plurality of candidate rotations, according to an embodiment of the present disclosure.

In the embodiment described above with reference to FIG. 2, a rotation to be applied to the 360 degree content is selected from among a plurality of candidate rotations in step S202. A method of selecting a suitable rotation will now be described with reference to FIG. 7. FIG. 7 illustrates a flowchart for compressing 360 degree content by evaluating a plurality of candidate rotations, according to an embodiment of the present disclosure. Steps S701, S705, S706 and S707 of FIG. 7 are similar to steps S201, S203, S204 and S205 of FIG. 2 respectively, and for the sake of brevity a detailed explanation of similar aspects will not be repeated here.

Continuing with reference to FIG. 7, once the 360 degree content has been received, a plurality of candidate rotations for the current 360 degree image are selected in step S702. The candidate rotations are rotations that may be expected to increase the compression ratio for the compressed 360 degree image, relative to a compression ratio that would be achieved for the as-received 360 degree image.

Once the candidate rotations have been selected in step S702, then in step S703 the candidate rotations are evaluated in order to determine a compression ratio that could be achieved for each rotation. In the present embodiment each candidate rotation is evaluated by applying the rotation to the as-received image, applying the compression algorithm to the rotated image, and determining the resulting compression ratio that is achieved.

In other embodiments the candidate rotations may be evaluated by estimating the compression ratio that will be achieved. The compression ratio may be estimated based on properties of the rotated image and knowledge of the compression algorithm, for example, by detecting directionality of features within the rotated image and comparing these to orientations that are known to result in greater compression, such as horizontal or vertical orientations.

Once the candidate rotations have been evaluated in step S703, then in step S704 the candidate rotation which gave the highest compression ratio is selected as the rotation to be applied to the 360 degree image. The system then proceeds to apply the rotation in step S705, compress the image in step S706, and output the compressed image and rotation parameter in step S707, in a similar manner to that described above with reference to FIG. 2.

In the embodiment illustrated in FIG. 7, the plurality of candidate rotations that are selected in step S702 comprises a subset of all possible rotations that could be applied to the 360 degree image. By choosing a subset of rotations to analyze in step S703, the overall computational burden and the time taken to process one 360 degree image can be reduced.

Figure 8:
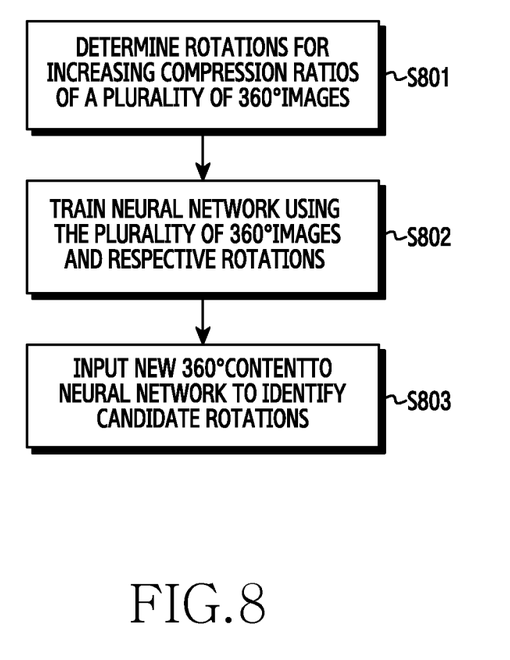
FIG. 8 is a flowchart for using a neural network to determine a rotation to increase the compression ratio for 360 degree content, according to an embodiment of the present disclosure.

Various methods of selecting the candidate rotations are possible. FIG. 8 illustrates a flowchart for using a neural network to determine a rotation to increase the compression ratio for 360 degree content, according to an embodiment of the present disclosure. First, in step S801 a plurality of 360 degree images are obtained, and an associated rotation which increases the compression ratio is determined for each of the 360 degree images. The plurality of 360 degree images and the associated rotations are used to train the neural network in step S802, so that the neural network learns to identify rotations that are likely to increase the compression ratio for different input images.

For example, in step S801 the rotation for each image can be determined by conducting an exhaustive search of all possible rotations in order to identify the rotation that gives the highest increase in the compression ratio relative to the un-rotated image, in order to determine the optimum rotation for that image. Whilst an exhaustive search may be computationally intensive, the processing during step S801 only needs to be performed once when initially training the neural network, and can be performed offline. As an alternative to an exhaustive search, in other embodiments in step S801 a rotation for each image can be determined using any of the other methods described herein.

Once the neural network has been trained, then in step S803 the neural network can be applied to a new input image. Here, a 'new' input image refers to a 360 degree image that is different to the images which were used to train the network. By inputting the new 360 degree image into the neural network, a plurality of candidate rotations can be determined. For example, the neural network can be configured to output a plurality of candidate rotations. Alternatively, the neural network can be configured to output a single rotation, which may be the estimated optimum rotation, and the plurality of candidate rotations can be chosen by selecting a certain number of rotations that are close to the rotation which was obtained by the neural network. In this way, the plurality of candidate rotations can be subsequently evaluated in step S703 in order to further refine the estimate of the optimum rotation that was obtained by the neural network.

As a further alternative, in some embodiments the neural network may be configured to output a single estimated optimum rotation, and the estimated optimum rotation may be directly applied in step S203 without evaluating a plurality of candidate rotations.

Although in the embodiment of FIG. 8 a neural network is used to select the candidate rotations, in order embodiments different methods of selecting the candidate rotations may be used. For example, in some embodiments the plurality of candidate rotations can be randomly selected from among a plurality of possible rotations.

Alternatively, in some embodiments the plurality of candidate rotations can be selected based on image analysis of the 360 degree image. For example, in one embodiment the plurality of candidate rotations can be selected by analyzing the received 360 degree image to identify a region of low complexity within the 360 degree image, and selecting rotations which will place the identified region in a predefined area of the rotated 360 degree image as the candidate rotations. For instance, in the 360 degree image shown in FIG. 4, the scene comprises a room in which the ceiling is relatively uniform, and hence has a low complexity relative to other parts of the scene. In the example shown in FIG. 4, a rotation is applied which places the ceiling in the top of the equirectangular projection. This can reduce the compression ratio since the top and bottom regions in an equirectangular projection are more distorted than other regions of the projection, and placing a region of low complexity in this part of the projection reduces the impact of the distortion when the rotated image is subsequently compressed.

In another embodiment, the plurality of candidate rotations can be selected by analyzing the received 360 degree image to identify a region of high frequency within the 360 degree image, and selecting rotations which will place the identified region in a predefined area of the rotated 360 degree image as the candidate rotations. For example, the rotation can be chosen so as to position a region of high frequency in part of the 2D projection which is relatively free from distortion, so that image data in the high-frequency region can be efficiently compressed by the compression algorithm.

In another embodiment, the plurality of candidate rotations can be selected by performing line detection on the received 360 degree image to determine a representative line orientation of the 360 degree image, and selecting rotations which will bring the representative line orientation closer to one or more predefined directions, as the candidate rotations. For compression algorithms which utilize directionality within the image in order to achieve a higher compression, this approach can achieve a higher compression ratio by aligning linear features within the image along directions which are known to be more efficiently compressed by the chosen compression algorithm.

In embodiments in which the 360 degree content is 360 degree video, the plurality of candidate rotations can be selected by obtaining motion vectors for one or more moving objects in the frames of the 360 degree video, and selecting rotations which will reduce an overall motion vector for the 360 degree image as the candidate rotations. This can increase the similarity between consecutive frames, resulting in an increase in the compression ratio that is achieved when the 360 degree video is compressed.

Figure 9:
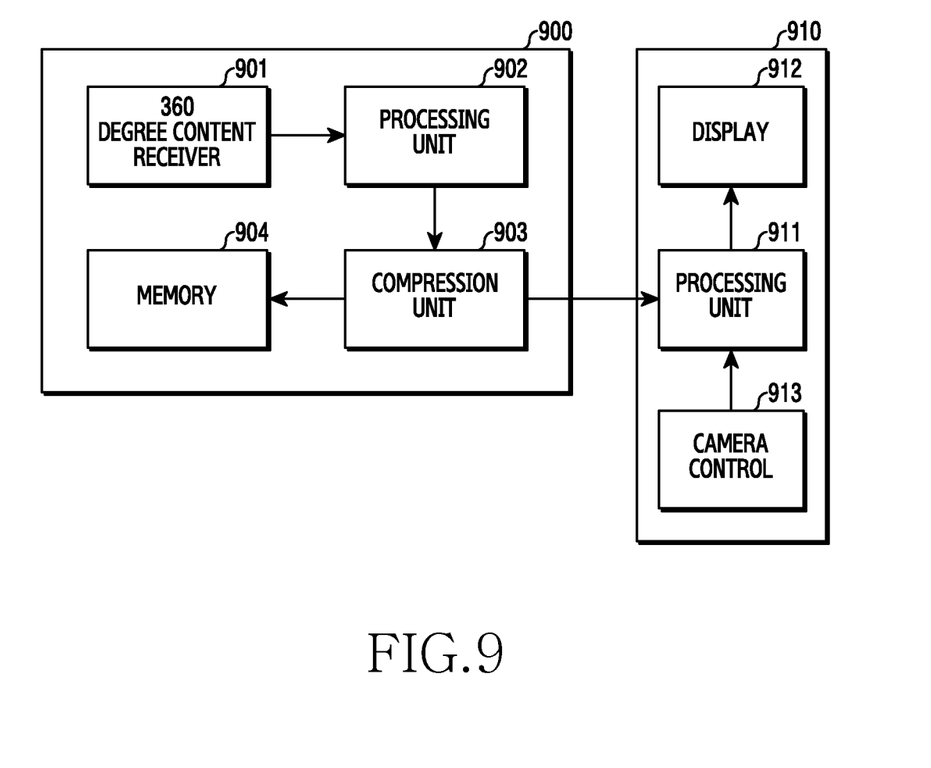
FIG. 9 illustrates an apparatus for compressing 360 degree content and reproducing the compressed 360 degree content, according to an embodiment of the present disclosure.

FIG. 9 illustrates an apparatus for compressing 360 degree content and reproducing the compressed 360 degree content, according to an embodiment of the present disclosure. The apparatus illustrated in FIG. 9 can perform any of the methods described above. In the present embodiment, the apparatus comprises a compression apparatus 900 and reproduction apparatus 910. The compression apparatus 900 can be referred as a 'first electronic device' and reproduction apparatus 910 can be referred as a 'second electronic device'. For example, the compression apparatus 900 may be a 360 degree content server or a broadcast provider, and the reproduction apparatus 910 may be a user device capable of displaying 360 degree content, such as a virtual reality headset, digital television, computer, or mobile phone handset.

The compression apparatus 900 comprises a 360 degree content receiver 901 for receiving an input such as 360 degree content comprising at least one 360 degree image. The 360 degree content receiver 901 can be any hardware or software element capable of receiving 360 degree content. For example, when the compression apparatus 900 is embodied in a 360 degree camera, the 360 degree content receiver 901 may be an internal interface configured to receive the 360 degree content from the camera sensor. When the compression apparatus 900 is embodied separately to the apparatus which captures the 360 degree content, the 360 degree content receiver 901 can be a suitable wired or wireless interface for receiving the 360 degree content such as a network interface, or a device-to-device connector such as a Universal Serial Bus (USB) connector.

The compression apparatus 900 further comprises a processing unit 902 and a compression unit 903. The processing unit 902 is configured to apply a rotation to the received 360 degree image such that a compression ratio achieved when the 360 degree content including the rotated 360 degree image is compressed using a compression algorithm is increased, relative to a compression ratio that would be achieved when applying the compression algorithm to the as-received 360 degree content. The compression unit 903 is configured to compress the 360 degree content including the rotated 360 degree image using the compression algorithm, and to output the compressed 360 degree content and a rotation parameter defining the applied rotation. The compression apparatus 900 may further comprise a memory 904 such as a computer-readable memory for storing the compressed 360 degree content and/or the rotation parameter.

The reproduction apparatus 910 comprises a processing unit 911, which may also be referred to as a reproduction unit 911. The reproduction unit 911 is configured to reproduce the 360 degree content by determining an inverse rotation to be applied to the compressed 360 degree image based on the rotation parameter received from the compression apparatus 900, applying the inverse rotation to the compressed 360 degree image, and rendering the rotated 360 degree image. In the present embodiment the reproduction apparatus 910 comprises a display 912 for displaying the rendered 360 degree content. However, in other embodiments the reproduction unit 911 can be configured to output the rendered 360 degree content to an external display.

In addition, the reproduction apparatus 910 further comprises a camera control 913 for receiving an input such as a camera control input defining a rotation and/or translation. As described above in relation to steps S207 and S209 of FIG. 2, the reproduction unit 911 can be configured to apply the rotation and/or translation defined by the camera control input in addition to the rotation defined by the rotation parameter.

Embodiments of the disclosure have been described in which 360 degree content is compressed and outputted together with a rotation parameter which defines the rotation that was applied prior to compression. In some embodiments, the uncompressed 360 degree content may be outputted together with the rotation parameter, without having applied the compression algorithm. For example, a 360 degree camera may determine suitable rotations substantially in real-time as the 360 degree content is captured, and output the rotation parameters together with the uncompressed 360 degree content. Another device may subsequently receive the as-captured 360 degree content and the rotation parameters from the 360 degree camera and carry out the compression.

Figure 10:
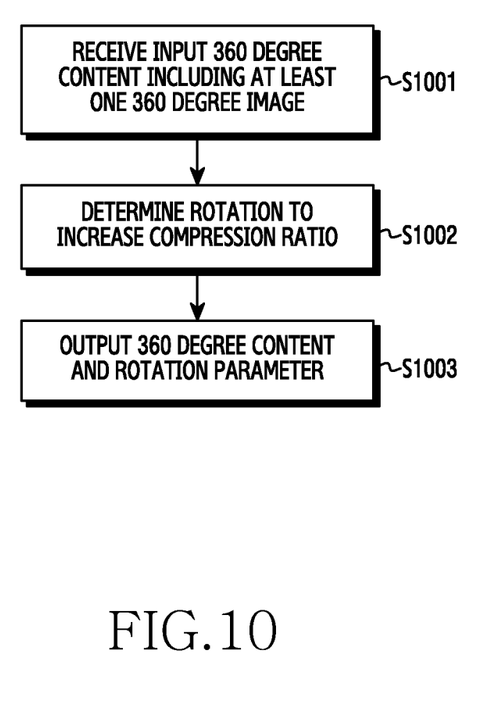
FIG. 10 illustrates a flowchart for processing 360 degree content, according to an embodiment of the present disclosure.

FIG. 10 illustrates a flowchart for processing 360 degree video, according to an embodiment of the present disclosure. In the method shown in FIG. 10, 360 degree content comprising a 360 degree image is obtained in step S1001, and a suitable rotation for the current 360 degree image is determined in step S1002. The uncompressed 360 degree content and the rotation parameter are then outputted in step S1003. A method such as the one shown in FIG. 10 may be performed by apparatus such as the compression apparatus 900 shown in FIG. 9, except that the compression unit 903 may be omitted and the processing unit 902 can output the as-received 360 degree content together with the determined rotation parameter.

Whilst certain embodiments of the disclosure have been described herein with reference to the drawings, it will be understood that many variations and modifications will be possible without departing from the scope of the disclosure as defined in the accompanying claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating an electronic device, the method comprising:
receiving a content including at least one 360 degree image;
performing line detection on the at least one 360 degree image to determine a representative line orientation of the at least one 360 degree image;
selecting a plurality of rotations having the representative line orientation closer to one or more predefined directions;
compressing the content including the at least one 360 degree image that is rotated based on the plurality of selected rotations; and
outputting the compressed content and a rotation parameter that defines the plurality of selected rotations.

2. The method of claim 1, further comprising:
evaluating the plurality of rotations to select a rotation that is applied to the at least one 360 degree image, and selecting the rotation that gives a highest compression ratio among the plurality of rotations.

3. The method of claim 1, wherein the content is 360 degree video and the at least one 360 degree image is one of a plurality of frames, the method further comprising:
selecting a rotation that is applied to the at least one 360 degree image based on one or more rotations previously applied to one or more other frames of the 360 degree video.

4. The method of claim 3, wherein different rotations are selected for different frames in the 360 degree video.

5. The method of claim 2, further comprising selecting the plurality of rotations randomly from a plurality of possible rotations.

6. The method of claim 1, wherein the plurality of rotations are selected based on at least one of:
analyzing the at least one 360 degree image to identify a first region of low complexity within the at least one 360 degree image, and selecting rotations that place the identified first region in a predefined area of the at least one 360 degree image that is rotated as the plurality of selected rotations, analyzing the at least one 360 degree image to identify a second region of high frequency within the at least one 360 degree image, and selecting rotations that place the identified second region in a predefined area of the at least one 360 degree image that is rotated as the plurality of selected rotations, or inputting the at least one 360 degree image to a neural network configured to determine candidate rotations that increase a compression ratio for a given input image.

7. The method of claim 1, further comprising:
determining, for each one of a plurality of 360 degree images, a rotation for increasing a compression ratio of the respective 360 degree image; and
training a neural network using the plurality of 360 degree images and the respective determined rotations.

8. The method of claim 1, wherein the content is 360 degree video and the at least one 360 degree image is one of a plurality of frames, and the plurality of rotations are selected by:
obtaining motion vectors for one or more moving objects in the frames of the 360 degree video; and
selecting rotations that reduce an overall motion vector for the at least one 360 degree image as the plurality of selected rotations.

9. The method of claim 1, further comprising:
selecting a compression algorithm from a plurality of available compression algorithms, and
selecting a plurality of candidate rotations in accordance with the selected compression algorithm.

10. A first electronic device comprising:
a receiver configured to receive content comprising at least one 360 degree image; and
a processor operably connected to the receiver and configured to:
perform line detection on the at least one 360 degree image to determine a representative line orientation of the at least one 360 degree image,
select a plurality of rotations having the representative line orientation closer to one or more predefined directions,
compress the content including the at least one 360 degree image that is rotated based on the plurality of selected rotations, and
output the compressed content and a rotation parameter that defines the plurality of selected rotations.

11. The first electronic device of claim 10, wherein the processor is configured to:
evaluate the plurality of rotations to select a rotation that is applied to the at least one 360 degree image; and
select the rotation that gives a highest compression ratio among the plurality of rotations.

12. The first electronic device of claim 10, wherein the content is 360 degree video and the at least one 360 degree image is one of a plurality of frames; and
wherein the processor is configured to select a rotation that is applied to the at least one 360 degree image based on one or more rotations previously applied to one or more other frames of the 360 degree video.

13. The first electronic device of claim 11, wherein the processor is configured to select the plurality of rotations randomly from a plurality of possible rotations or select the plurality of rotations based on an image analysis of the at least one 360 degree image.

14. The first electronic device of claim 13, wherein:
the content is 360 degree video and the at least one 360 degree image is one of a plurality of frames, and
to select the plurality of rotations, the processor is configured to:
obtain motion vectors for one or more moving objects in the frames of the 360 degree video; and
select rotations that reduce an overall motion vector for the at least one 360 degree image as the plurality of selected rotations.

15. The first electronic device of claim 13, wherein the processor is configured to:
select a compression algorithm from a plurality of available compression algorithms; and
select a plurality of rotations in accordance with the selected compression algorithm.

16. A second electronic device comprising:
a receiver configured to receive content comprising at least one 360 degree image; and
a processor operably connected to the received and configured to:
apply a rotation to the at least one 360 degree image to increase a compression ratio,
compress the content including the at least one 360 degree image that is rotated based on a compression algorithm, and
output the compressed content and a rotation parameter that defines the applied rotation; and
a reproduction unit operably connected to the processor and configured to:
reproduce the content;
determine an inverse rotation that is applied to the compressed at least one 360 degree image based on the rotation parameter, wherein the inverse rotation is an opposite rotation to the rotation that was applied before compression; and
apply the inverse rotation to the compressed at least one 360 degree image to obtain a second rotated at least one 360 degree image, and render the second rotated at least one 360 degree image.

17. The second electronic device of claim 16, wherein the reproduction unit is further configured to:
receive camera control input defining a camera rotation that is applied during reproduction of the content; and
obtain the second rotated at least one 360 degree image based on the camera rotation in addition to the inverse rotation.

18. The second electronic device of claim 17, wherein the content is a 360 degree video and the at least one 360 degree image is one of a plurality of frames,
wherein the processor is configured to output the rotation parameter as metadata associated with the compressed content, the metadata further comprising a camera stabilization parameter defining one or more stabilizing rotations that is applied to one or more of the plurality of frames for stabilizing the 360 degree video during reproduction, and
wherein the reproduction unit is configured to obtain the second rotated at least one 360 degree image by applying the one or more stabilizing rotations corresponding to the at least one 360 degree image in addition to the inverse rotation.

19. The second electronic device of claim 18, wherein the compression algorithm is an encoding algorithm for converting the content to a different format relative to a format of the received content.

* * * * *